(12) United States Patent
Togino

(10) Patent No.: US 7,616,389 B2
(45) Date of Patent: Nov. 10, 2009

(54) OPTICAL SYSTEM

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 212 days.

(21) Appl. No.: 11/652,744

(22) Filed: Jan. 11, 2007

(65) Prior Publication Data
US 2007/0160367 A1 Jul. 12, 2007

(30) Foreign Application Priority Data
Jan. 12, 2006 (JP) .............................. 2006-004818

(51) Int. Cl.
*G02B 13/06* (2006.01)
(52) U.S. Cl. ...................... 359/725; 359/866
(58) Field of Classification Search ......... 359/668–670, 359/725–732, 664, 649, 831–837, 866
See application file for complete search history.

(56) References Cited

U.S. PATENT DOCUMENTS

| | | | |
|---|---|---|---|
| 2,964,997 A | 12/1960 | Van Heel et al. | |
| 3,283,653 A | 11/1966 | Tokarzewski | |
| 3,552,820 A | 1/1971 | Brachvogel | |
| 5,473,474 A | 12/1995 | Powell | |
| 6,003,998 A | 12/1999 | St. Hilaire | |
| 6,597,520 B2 | 7/2003 | Wallerstein et al. | |
| 6,611,282 B1 | 8/2003 | Trubko et al. | |
| 2004/0008423 A1 | 1/2004 | Driscoll, Jr. et al. | |
| 2006/0114575 A1* | 6/2006 | Togino | 359/725 |

FOREIGN PATENT DOCUMENTS

| | | |
|---|---|---|
| JP | 6-85019 | 3/1994 |
| JP | 2005-216373 | 8/2005 |
| JP | 2005-222591 | 8/2005 |

\* cited by examiner

*Primary Examiner*—Euncha P Cherry
(74) *Attorney, Agent, or Firm*—Kenyon & Kenyon LLP

(57) ABSTRACT

The invention relates to an optical system adapted to take or project high-definition images with well corrected aberrations for the purpose of taking images from a 360° panoramic scene on a cylindrical, conical or other three-dimensional surface or project such a three-dimensional display surface onto a 360° field of view. Images from the 360° panoramic scene are formed on a rotationally symmetric, three-dimensional image surface 3. The optical system comprises at least one rotationally symmetric reflective surface 2, the position of an entrance pupil 4s with respect to a sagittal section is different from the position of an exit pupil 4m with respect to a meridional section.

6 Claims, 13 Drawing Sheets

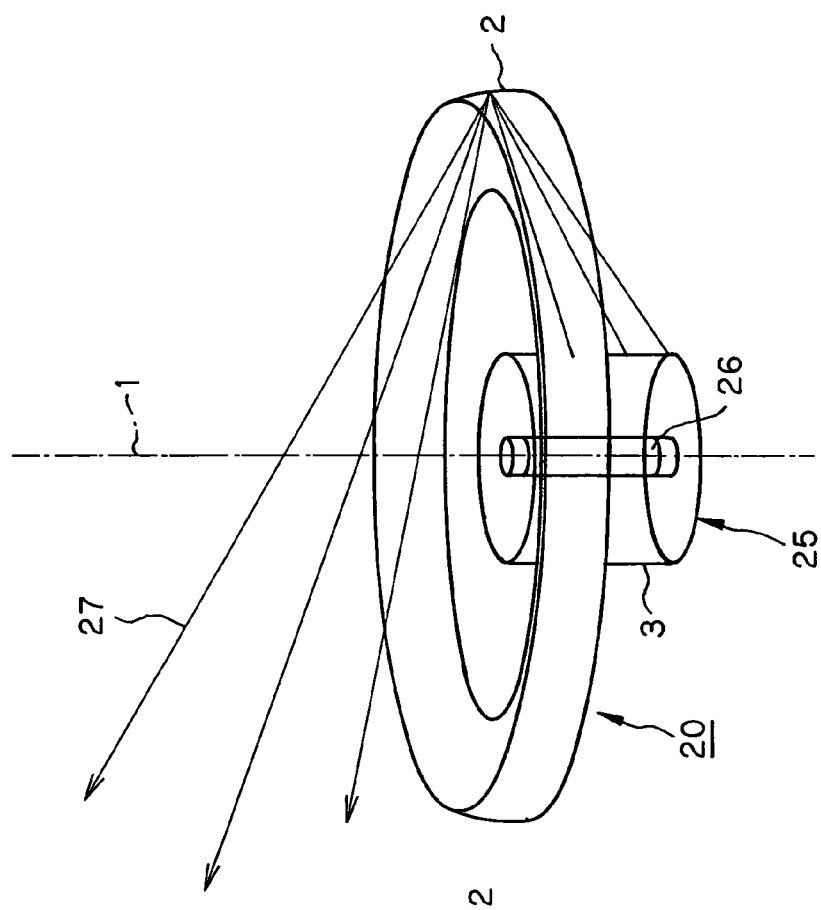
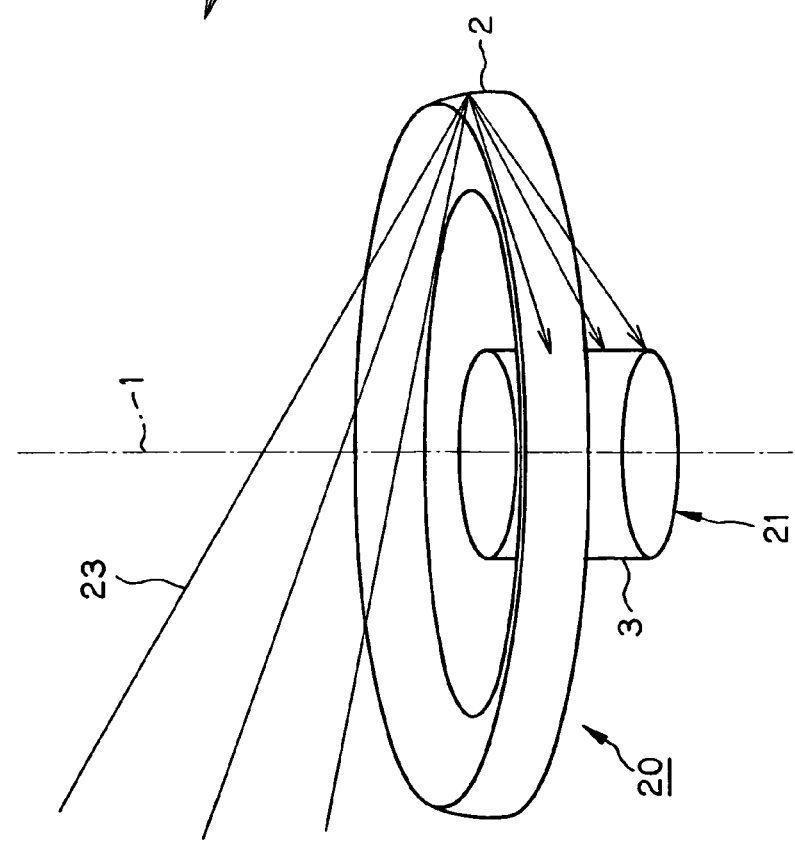

OPTICAL SYSTEM

This application claims benefit of Japanese Application No. 2006-4818 filed in Japan on Jan. 12, 2006, the contents of which are incorporated by this reference.

BACKGROUND OF THE INVENTION

The present invention relates generally to an optical system, and more specifically to an optical system adapted to take images from images from a 360° panoramic scene on a cylindrical, conical or other three-dimensional imaging surface or to project a cylindrical, conical or other three-dimensional display surface onto a 360° field of view.

For the projection of images onto a 360° screen, the linking of images from multiple projectors to one another has been implemented, or a wide-angle optical system such as a fisheye lens has been used. Such prior arts are typically set forth in the following publications.
Patent Publication 1
United States Patent Application No. 2004/8423
Patent Publication 2
JP-B 6-85019
Patent Publication 3
U.S. Pat. No. 5,473,474
Patent Publication 4
U.S. Pat. No. 3,283,653
Patent Publication 5
U.S. Pat. No. 3,552,820
Patent Publication 6
U.S. Pat. No. 6,611,282
Patent Publication 7
U.S. Pat. No. 6,597,520

For the projection or formation of images onto or from the 360° panoramic scene, they have so far been projected from one single or multiple planes onto a cylindrical or spherical surface, or vice versa. Until now, however, there is nothing known about the projection of images from, for instance, a cylindrical, spherical or conical surface onto a cylindrical or spherical surface or vice versa.

In this connection, as can be seen from organic EL devices, future display or imaging devices are fairly likely to have a display or imaging surface defined by a cylindrical, spherical, conical or other rotationally symmetric surface.

SUMMARY OF THE INVENTION

In view of such prior art situations as described above, an object of the present invention is to provide an optical system with well corrected aberrations, which is adapted to take images from the 360° panoramic scene on a cylindrical, conical or other three-dimensional display surface or project such a three-dimensional display surface onto the 360° field of view in the distance.

According to the invention, this object is achieved by the provision of an optical system adapted to form images from a 360° panoramic scene on a rotationally symmetric, three-dimensional image surface and having at least one rotationally symmetric reflective surface, characterized in that an entrance pupil position with respect to a sagittal section is different from an entrance pupil position with respect to a meridional section.

Preferably in this case, said rotationally symmetric, three-dimensional image surface is coaxial with said rotationally symmetric reflective surface.

It is also preferable that an entrance pupil with respect to a sagittal section and an exit pupil with respect to a sagittal section are located at different positions on an axis of rotational symmetry of said reflective surface.

Further, it is desired that said at least one rotationally symmetric reflective surface comprises an internal reflecting mirror, wherein a light ray from the 360° panoramic scene enters a transparent medium through at least one transmitting surface for reflection at said internal reflecting mirror, and then leaves said transparent medium through at least one transmitting surface to form an image on said image surface.

Still further, it is desirable to satisfy the following condition:

$$0.1 < EP/Rr < 10 \tag{1}$$

Here EP is a distance from the entrance pupil position with respect to said sagittal section to an exit pupil position with respect to said sagittal section, and Rr is a distance from the axis of rotational symmetry to said at least one reflective surface.

Furthermore, it is preferable that said reflective surface has a rotationally symmetric shape defined by rotation about the axis of rotational symmetry of a line segment of any desired shape that has no plane of symmetry in a section including the axis of rotational symmetry, or a rotationally symmetric shape defined by rotation about the axis of rotational symmetry of a line segment of any desired shape that includes an odd-numbered term in a section including the axis of rotational symmetry.

If the object surface and image surface of said optical system are reversed, then it could be used as a projection optical system.

According to the invention as recited above, it is possible to obtain an optical system adapted to take images from the 360° panoramic scene on a cylindrical, conical, spherical or other three-dimensional imaging surface or project such a three-dimensional display surface onto the 360° field of view, which is used as an imaging system capable of taking images well corrected in terms of aberrations and having high definition or a projection system capable of projecting such images.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 13(a) is illustrative in schematic of an optical path in the event that the optical system of the invention is used as a panoramic taking optical system, and FIG. 13(b) is illustrative in schematic of an optical path in the event that it is used as a panoramic projection optical system.

DESCRIPTION OF THE PREFERRED EMBODIMENT

Figure 1:
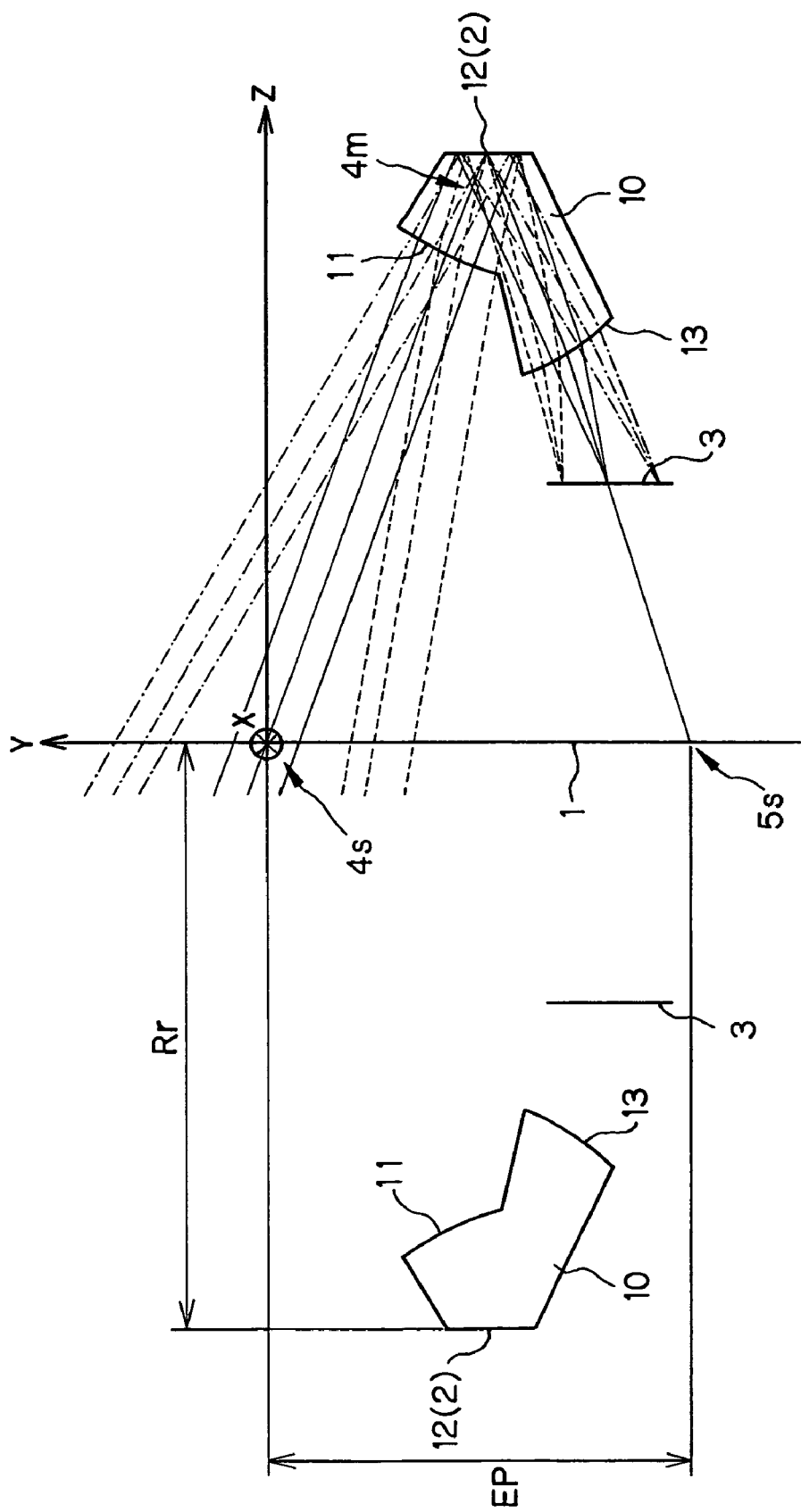
FIG. 1 is illustrative in section of the optical system of Example 1 according to the invention, as taken along the center axis of rotation.

The optical system of the invention is now explained with reference to examples. In principles, when it is an imaging system, it will be explained with reference to normal ray tracing, and when it is a projection system, it will be explained with reference to back ray tracing.

If images from the 360° panoramic scene in the distance can be formed on a cylindrical, conical, spherical or other three-dimensional image surface, an optical system adapted to take images from the 360° panoramic scene can be simplified and slimmed down. When the imaging system is built up of transmission lenses as usual, there is one possible approach where multiple projection lens systems are radially located around a cylindrical imaging surface to take images from the 360° panoramic scene. With this approach, however, it would be impossible to link together all the taken images unless the alignment of the transmission lens systems is under strict control.

A projection system can be simplified and slimmed down by permitting images displayed on a display device having a cylindrical, conical, spherical or other rotationally symmetric, three-dimensional display surface onto a 360° field of view in the distance. When the projection system is built up of transmission lenses as usual, there is one possible approach where multiple projection lens systems are radially located around a cylindrical display surface to project images onto the 360° field of view. With this approach, however, it would be impossible to link together all the projected images unless the alignment of the transmission lens systems is under strict control.

Further, the image surface of each optical system (a projection lens system in the event of the imaging system, and a projection lens system in the event of the projection system) is defined by a cylindrical surface that is curved in one direction only; for correction of this, it is necessary to use a rotationally asymmetric optical surface that is difficult to fabricate.

With such an optical system as used in the prior art, images from the full 360° panoramic scene are formed as flat, annular images (such display images are formed in the event of the projection system), so such distorted images must be electronically converted into right ones for viewing. In the event of the projection system, on the other hand, the right images must be electronically converted into such annularly distorted ones.

In the invention, therefore, in order to form images from the 360° panoramic scene on such a rotationally symmetric, three-dimensional image surface as described above, the optical system comprises at least one rotationally symmetric reflective surface, wherein an entrance pupil position with respect to a sagittal section is different from an entrance pupil position with respect to a meridional section.

In general, an entrance pupil (in the case of an imaging system) lies at a position where a light beam at each angle of view comes together, and an effective diameter becomes small, too, in the case of a general imaging lens system. However, when images from the 360° panoramic scene are to be taken as contemplated herein, the use of a fisheye lens or the like allows an entrance pupil to rest on the axis of rotational symmetry. As a light beam to form an image peripherally is passed through one entrance pupil on the axis of rotational symmetry for image formation, it applies too much load on the tip portion of a lens system, and causes a lens diameter to grow very large as well. In the invention, therefore, while the entrance pupil for the sagittal section remains placed on the axis of rotational symmetry, the entrance pupil for the meridional section is located at a position different from the entrance pupil position for the sagittal section, whereby it is possible to provide a small-format optical system that, albeit having a wide angle (in the vertical direction of the meridional section), is capable of taking images from the 360° panoramic scene.

FIG. 1 is illustrative in section of the optical system of Example 1 to be referred to later, inclusive of the center axis 1 of rotation (the axis of rotational symmetry). This optical system is to form images from the 360° panoramic scene in the distance onto an image surface 3 that has a rotationally symmetric, three-dimensional shape about the center axis 1 of rotation (a cylindrical image surface in this example), comprising at least one reflective surface 2 of rotational symmetry about the center axis 1 of rotation.

And then, when an entrance pupil 4s for the sagittal section remains positioned on the axis 1 of rotational symmetry, an entrance pupil 4m for the meridional section is located at a position different from that of the entrance pupil 4s for the sagittal section; in the example here, it is located at a position near the reflective surface 2. It is thus possible to form images from the 360° panoramic scene on the image surface 3 while there is a wide angle kept in the meridional section.

To form images from the 360° continuous panoramic scene, each optical surface must be rotationally symmetric. When an optical system is composed only of transmission optical elements, however, all transmission surfaces become rotationally symmetric with respect to the axis 1 of rotational symmetry, so that it is very difficult to allow the optical system to have the positive power necessary for image formation in the sagittal section. In the invention, therefore, the optical system is designed to have at least one annular reflective surface 2 that is rotationally symmetric with respect to the axis 1 of rotational symmetry. Without this annular reflective surface 2, it is impossible for the optical system to have a positive power at a focal length about half the radius of rotation of the reflective surface 2 in the sagittal section.

Further, it is preferable that the rotationally symmetric, three-dimensional image surface 3 and the rotationally symmetric reflective surface 2 are coaxial. This arrangement makes it possible to take images from 360° panoramic scene in an equal distance. Misalignment of the axes of rotational symmetry will bring about a biased object distance, resulting in the incapability of taking high-resolution images.

Further, it is preferable that the entrance pupil 4s for the sagittal section and an exit pupil 5s for the sagittal section are spaced away from each other on the axis 1 of rotational symmetry. When images from the 360° panoramic scene are formed on the image surface 3 as contemplated herein, light rays to form images on the three-dimensional image surface 3 arrive at the annular reflective surface 2 as if they were emitted from the entrance pupil 4s for the sagittal section on the axis 1 of rotational symmetry. After reflection at that reflective surface 2, they travel toward the image surface 3 through the exit pupil 5s for the sagittal section (on the axis 1 of rotational symmetry), forming images on the image surface 3. Here, if the entrance surface 4s for the sagittal section and the exit pupil 5s for the sagittal section are in alignment or proximity, there will be light shading occurring at the image surface 3 per se, ending up with the incapability of forming images.

More preferably, at least one annular reflective surface 2 is made up of an internal reflecting mirror 12. With the optical system of the invention, light rays take on a bent decentered path arrangement, because the entrance pupil 4s and exit pupil 5s for the sagittal section are spaced away from each other on the axis 1 of rotational symmetry, and the entrance pupil 4m for the meridional section is not found on the axis 1 of rotational symmetry. For this reason, decentration aberrations occurring at the reflective surface 2 grow large; this is not preferable for correction of aberrations. To reduce such decentration aberrations and simplify the arrangement of the optical system, therefore, it is preferable that at least one reflective surface 2 is made up of the internal reflecting mirror 12, wherein light rays from the 360° panoramic scene enter a transparent medium 10 through at least one transmitting surface 11, and after reflection at that internal reflecting mirror 12, they leave the transparent medium 10 through at least one transmitting surface 13 to form images on the image surface 3.

More preferably, it is preferable for the optical system to satisfy the following condition (1):

$$0.1 < EP/Rr < 10 \quad (1)$$

Here EP is the distance from the entrance pupil 4s for the sagittal section to the exit pupil 5s for the sagittal section, and Rr is the distance from the axis 1 of rotational symmetry to the center of the meridional section with respect to at least one reflective surface 2.

This condition (1) is about the quantity of decentration of light rays incident on the reflective surface 2. As the lower limit of 0.1 is not reached, it permits the quantity of decentration to become low, but it causes interference between the image surface 3 and the optical path, rendering it impossible to make large the angle of view in the vertical direction of the meridional section. As the upper limit of 10 is exceeded, on the other hand, it causes decentration aberrations to grow large, rendering resolving power worse.

In this conjunction, it is preferable that the entrance pupil for the meridional section is in a zonal form that is rotationally symmetric about the axis 1 of rotation symmetry.

More preferably, the reflective surface 2 has a rotationally symmetric shape defined by rotation about the axis 1 of rotational symmetry of a line segment of any desired shape that has no plane of symmetry in a section including the axis 1 of rotational symmetry. With this shape, there is the radius of curvature of the reflective surface 2 differing partly in the vertical direction of the axis 1 of rotational symmetry, which in turn makes it possible to correct decentration coma and decentration field curvature.

More preferably, the reflective surface 2 has a rotationally symmetric shape defined by rotation about the axis 1 of rotational symmetry of a line segment of any desired shape that includes an odd-numbered term in a section including the axis of rotational symmetry. This works for correction of aberrations, because the aberrations can be corrected with an ever higher degree of flexibility.

When the optical system is used for an imaging optical system, it is preferable to have angle limiting means for cutting off unnecessary light rays. For instance, the angle could be limited by means of an aperture located on the axis 1 of rotational symmetry, or the like.

When the optical system is used for a projection optical system, means having angle characteristics could be used as the means for illuminating the display surface 3 of the display device to limit the angle of light rays leaving that display surface 3.

With the invention as described above, it is possible to set up an optical system with the reflective surface 2 that has a rotationally symmetric reflective shape with respect to the axis 1 of rotational symmetry, which is capable of forming or projecting images from the 360° panoramic scene with no various aberrations. Rotationally symmetric elements can be processed by a processing technique similar to that for ordinary rotationally symmetric aspheric surfaces, and so fabricated at ever lower costs.

Set out below are the values about condition (1) in each of Examples 1-4, given below.

| | Example | | | |
|---|---|---|---|---|
| | 1 | 2 | 3 | 4 |
| EP | 12.736 | 25.524 | 23.965 | 19.729 |
| Rr | 18.043 | 25.000 | 28.053 | 22.134 |
| EP/Rr | 0.706 | 1.021 | 0.854 | 0.891 |

Examples 1 to 4 of the optical system according to the invention are now described. Essential parameters for these optical systems will be given later. The essential parameters in Examples 1-4 are based on the results of normal ray tracing from an object surface in the distance (which means a far object point conjugate to the image surface 3) through a reference surface set in such a way as to include the center axis 1 of rotation (the origin of coordinates X, Y, Z), then the entrance pupil 4s and then the reflective surface 2 to the image surface 3.

Referring here to a coordinate system for normal ray tracing, as shown typically in FIG. 1, the origin of a decentered optical surface in a decentered optical system is defined by a reference surface position with the entrance pupil 4s in the sagittal surface projected onto the center axis 1 of rotation, the Y-axis positive direction is defined by the direction of the center axis 1 of rotation going away from the image surface 3, and the Y-Z plane is defined by the sheet plane of FIG. 1. And then, the Z-axis positive direction is defined by a direction opposite to the side of the image surface now considered in the sheet plane of FIG. 1, and the X-axis positive direction is defined by an axis that forms a right-handed orthogonal coordinate system with the Y-axis and Z-axis.

Given for a decentered surface are the quantity of decentration from the center of the origin of the aforesaid optical system on a coordinate system on which that surface is defined (X, Y and Z are indicative of the X-axis direction, the Y-axis direction and the Z-axis direction, respectively), and the angles of tilt ($\alpha$, $\beta$, $\gamma$ (°)) of the coordinate systems for defining the surfaces with the centers on the X-, Y- and Z-axes, respectively. In that case, the positive signs for $\alpha$ and $\beta$ mean counterclockwise rotation with respect to the positive directions of the respective axes, and the positive sign for $\gamma$ means clockwise rotation with respect to the positive direction of the Z-axis. Referring here to how to perform $\alpha$-, $\beta$- and $\gamma$-rotations of the center axis of the surface, the coordinate system that defines each surface is first $\alpha$-rotated counterclockwise about the X-axis of the coordinate system that is defined at the origin of the optical system. Then, the coordinate system is $\beta$-rotated counterclockwise about the Y-axis of the rotated new coordinate system. Finally, the coordinate system is $\gamma$-rotated clockwise about the Z-axis of the rotated new another coordinate system.

When, of optical surfaces forming the optical system of each example, a specific surface and the subsequent surface form together a coaxial optical system, there is a surface spacing given. Besides, the radius of curvature of each surface and the refractive index and Abbe number of the medium are given according to common practices.

In this conjunction, an aspheric surface is a rotationally symmetric aspheric surface given by the following defining formula:

$$Z=(Y^2/R)/[1+\{1-(1+k)Y^2/R^2\}^{1/2}]+aY^4+bY^6+cY^8+dY^{10}+ \quad \text{(a)}$$

Here, Z is an optical axis (axial chief ray) provided that the direction of propagation of light is taken as positive, Y is a direction vertical to that optical axis, R is a paraxial radius of curvature, k is a conical coefficient, and a, b, c, d are the fourth-, sixth-, eighth-, tenth-order aspheric coefficients, respectively. The Z-axis in this defining formula becomes the axis of the rotationally symmetric aspheric surface.

The term "toric surface" here includes an X toric surface and a Y toric surface, as defined below. It is here noted that a straight line passing through the origin of surface shape and vertical to an optical surface provides the axis of the toric surface. On an XYZ orthogonal coordinate system with respect to the origin of surface shape, the X toric surface is given by $$F(X)=Cx \cdot X^2/[1+\{1-(1+k)Cx^2 \cdot X^2\}^{1/2}]+aX^4+bX^6+cX^8+dX^{10}\ldots$$

$$Z=F(X)+(\tfrac{1}{2})Cy\{Y^2+Z^2-F(X)^2\} \quad \text{(b)}$$

A curve F(X) is rotated about an axis passing through the center of the Y-axis direction curvature Cy in the Z-axis direction and parallel with the X-axis. The resultant surface becomes an aspheric surface in the X-Z plane, and a circle in the Y-Z plane.

The Y toric surface is given by $$F(Y)=Cy \cdot Y^2/[1+\{1-(1+k)Cy^2 \cdot Y^2\}^{1/2}]+aY^4+bY^6+cY^8+dY^{10}\ldots$$

$$Z=F(Y)+(\tfrac{1}{2})Cx\{X^2+Z^2-F(Y)^2\} \quad \text{(c)}$$

A curve F(Y) is rotated about an axis passing through the center of the X-axis direction curvature Cx in the Z-axis direction and parallel with the Y-axis. The resultant surface becomes an aspheric surface in the Y-Z plane, and a circle in the X-Z plane.

Note here that Z is the quantity of a displacement from a tangential plane with respect to the origin of surface shape, Cx is the X-axis direction curvature, Cy is the Y-axis direction curvature, k is a conical coefficient, and a, b, c and d are aspheric coefficients, and that between the X-axis direction radius of curvature Rx and Y-axis direction radius of curvature Ry and the curvatures Cx and Cy, there are the relations:

$$Rx=1/Cx, Ry=1/Cy$$

The extended rotation free-form surface is a rotationally symmetric surface given by the following definition.

First, there is the following curve (d) given, which passes on a Y-Z coordinate plane through its origin.

$$Z=(Y^2/RY)/[1+\{1-(C_1+1)Y^2/RY^2\}^{1/2}]C_2Y+C_3Y^2+C_4Y^3+C_5Y^4+C_6Y^5+C_7Y^6+\ldots+C_{21}Y^{20}+\ldots$$
$$C_{n+1}Y^n+ \quad \text{(d)}$$

Then, there is a curve F(Y) given where the curve (d) is rotated by an angle $\theta$ (°) with left-handed rotation defined as positive relative to the X-axis positive direction. This curve F(Y), too, passes on the Y-Z coordinate plane through the origin.

That curve F(Y) is parallel translated by a distance R in the Z-positive direction (in the Z-negative direction in the case of a negative sign), and the parallel translated curve is then rotated about the Y-axis. The thus obtained rotationally symmetric surface gives an extended rotation free-from surface.

As a consequence, the extended rotation free-form surface provides a free-form surface (smooth curve) in the Y-Z plane, and a circle with a radius |R| in the X-Z plane.

From this definition, the Y-axis becomes the axis of the extended rotation free-form surface (the axis of rotational symmetry).

Here, RY is the radius of curvature of a spherical term in the Y-Z section, $C_1$ is a conical constant, and $C_2$, $C_3$, $C_4$, $C_5$, ... are the first-, second-, third- and fourth-order aspheric coefficients, respectively.

In this regard, it is noted that a cylindrical surface (Y cylindrical surface) with an axis parallel with the Y-axis as the center axis is given as one Y toric surface; there is a Y toric surface of Rx=(the radius of the cylindrical surface) given provided that Ry=$\infty$, k, a, b, c, d, etc.=0, and Rx=(the radius of the cylindrical surface).

It is also noted that a conical surface with an axis parallel with the Y-axis as the center axis is given as one extended rotation free-form surface; it is given in terms of RY=$\infty$, $C_1$, $C_2$, $C_3$, $C_4$, $C_5$, etc.=0, $\theta$=(the angle of inclination of the conical surface), and R=(the radius of the base in the X-Z plane).

Further, a term relating to an aspheric surface with no data given in the essential parameters described later is zero. The refractive index and Abbe number are given on a d-line basis (of 587.56 nm wavelength), and length is given in mm. The decentration of each surface is represented in terms of the quantity of decentration from the reference surface.

EXAMPLE 1

Figure 2:
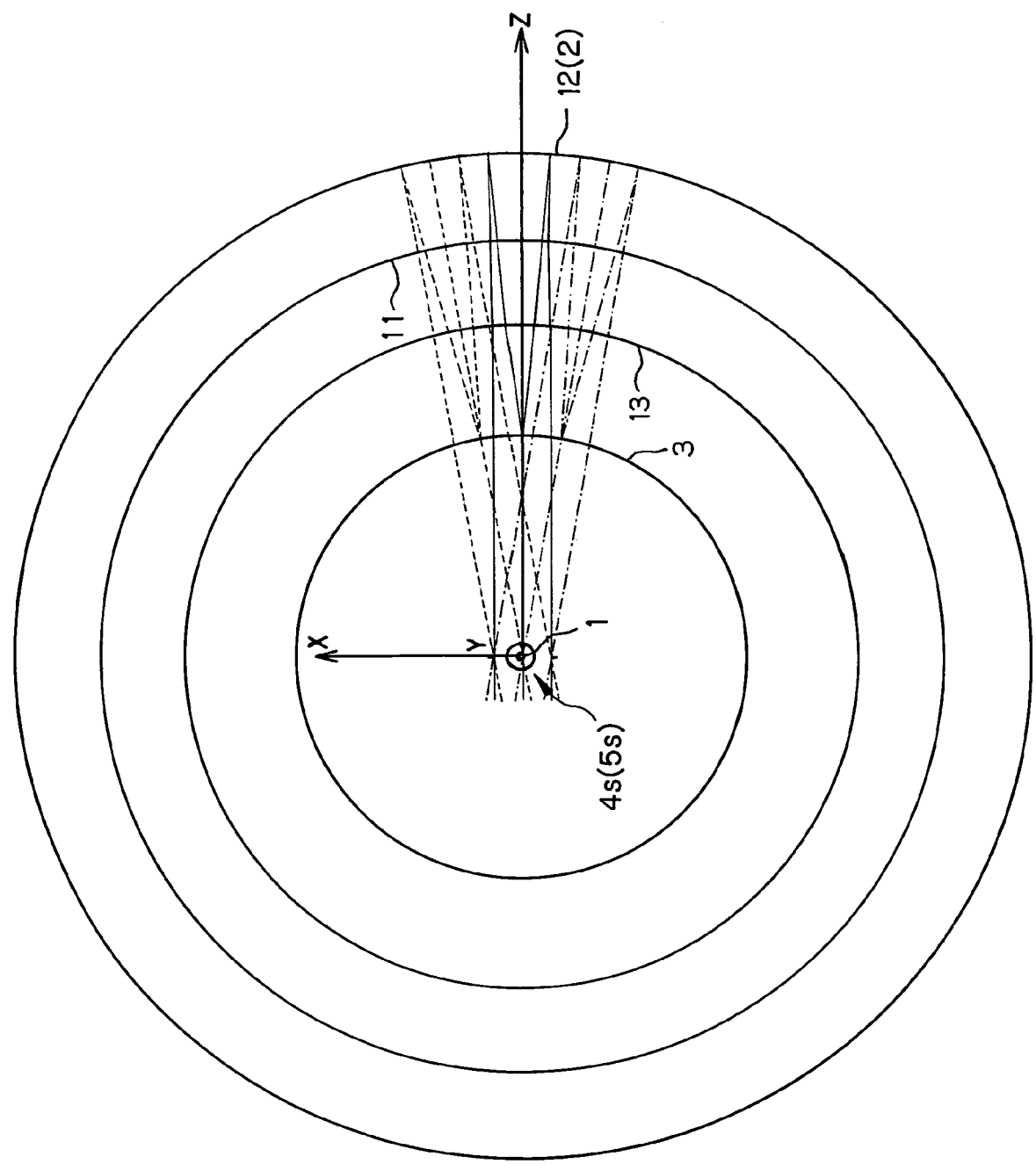
FIG. 2 is a plan view as taken in a direction along the center axis of rotation, illustrative of an optical path through the optical system of Example 1.
Figure 3:
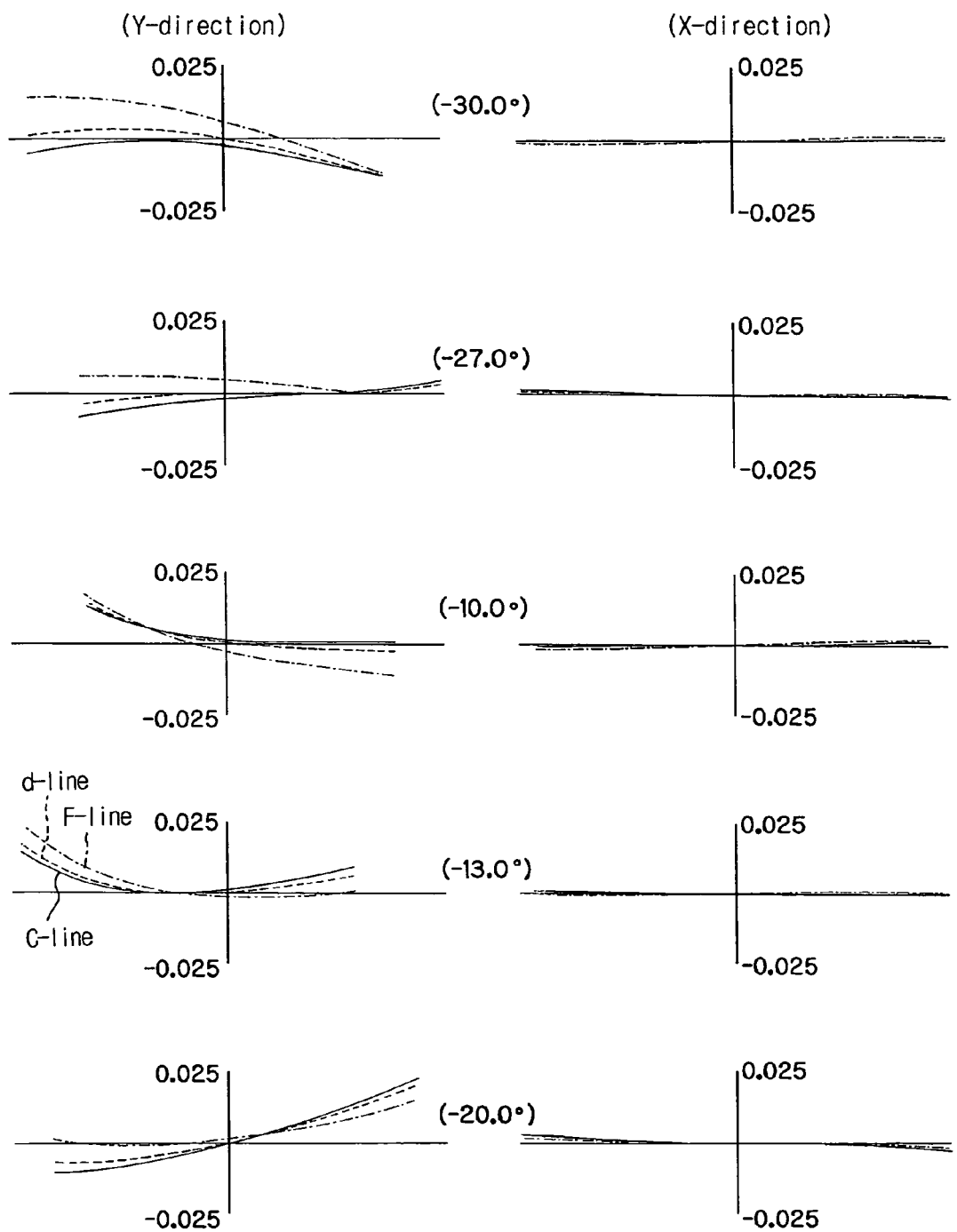
FIG. 3 is a transverse aberration diagram at an infinite object point for the whole optical system of Example 1.

FIG. 1 is a sectional view of the optical system of Example 1 as taken along the center axis 1 of rotation, FIG. 2 is a plan view of an optical path through that optical system as viewed along the center axis of rotation 1, and FIG. 3 is a transverse aberration diagram at an infinite object point for the whole optical system according to Example 1. In this transverse aberration diagram, the angles right in the middle are indicative of the angles of view in the vertical direction, and Y-direction (meridional) and X-direction (sagittal) transverse aberrations at those angles of view are indicated. Throughout the disclosure, a minus angle of view means a right-handed rotation angle with respect to the X-axis positive direction.

The example here is directed to an imaging optical system using a transparent medium 10 that is in an annular form with the center axis 1 of rotation as an axis of rotational symmetry, is of a reflecting prism shape in section and has a refractive index of greater than 1. The transparent medium 10 is made up of an entrance refractive surface 11, an internal reflective surface (mirror) 12 that forms a reflective surface 2, and an exit refractive surface 13. The optical surfaces 11, 12 and 13 are each made up of a rotationally symmetric surface with the center axis 1 of rotation as the axis of rotational symmetry; the entrance refractive surface 11, internal reflective surface 12 and exit refractive surface 13 are each formed of an extended rotation free-form surface, and an image surface (display surface) 3 is formed of a cylindrical surface. And then, an entrance pupil 4s and an exit pupil 5s in the sagittal surface are located at a distance on the Y-axis of the axis 1 of rotational symmetry (the center axis of rotation). In the meridional surface, the width of the internal reflective surface 12 in the direction of the axis 1 of rotational symmetry forms a stop, and an entrance pupil 4m for the meridional section is formed near the internal reflective surface 12.

As viewed according to normal ray tracing, light from an infinite object point (a projection surface in the case of back ray tracing) passes through the entrance pupil 4s in the sagittal surface and the decentered entrance refractive surface 11, entering the transparent medium 10. Then, the light enters the internal reflective surface 12 obliquely with respect to the Y-axis by way of a decentered optical path. Then, the light is reflected at that reflective surface 12, leaving the transparent medium 10 through the exit refractive surface 13. Then, the light travels toward the exit pupil 5s in the sagittal surface away from the entrance pupil 4s on the Y-axis, and finally enters the image surface (display surface) 3 on the entrance side of the exit pupil 5s to form an image of the object point.

With such decentered arrangement using the annular transparent medium 10 of a reflecting prism shape in section, the light from the 360° panoramic scene enters the transparent medium 10 through the entrance pupil 4s in the sagittal surface, then enters the internal reflective surface 12 through the entrance pupil 4m in the meridional surface, at which it is reflected, and leaves the transparent medium 10 to enter the image surface 3, so that it can be formed into a high-definition image in the range of 20° in the vertical angle of view of 10° to 30°.

The specifications of Example 1 are:

| | |
|---|---|
| Horizontal angle of view: | 360° |
| Vertical angle of view: | 20° |
| Entrance pupil diameter: | 2.00 mm |
| Image size: | Cylindrical surface of φ 16.04 mm and 2.90 mm in height |

EXAMPLE 2

Figure 4:
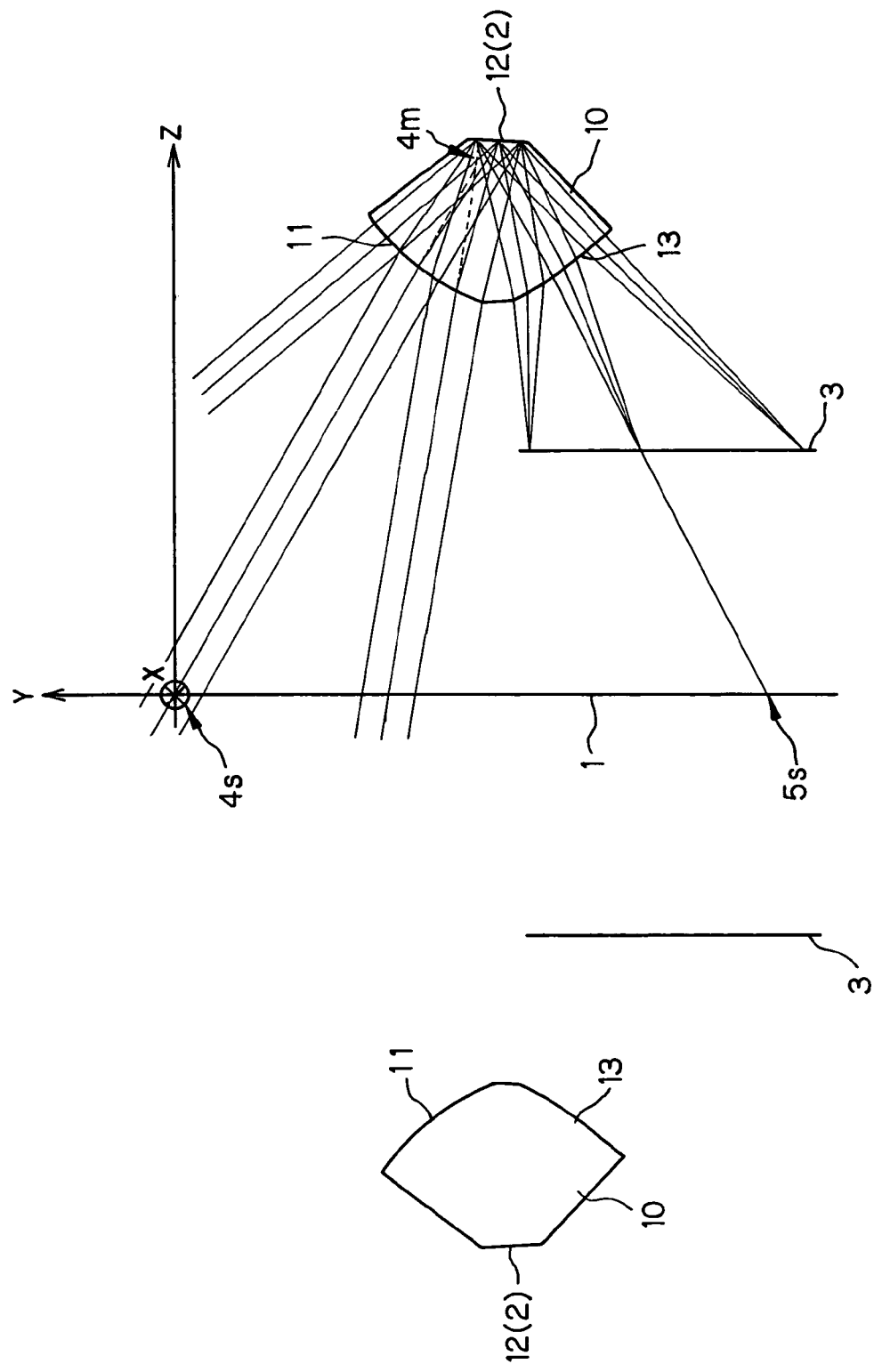
FIG. 4 is illustrative in section of the optical system of Example 2 according to the invention, as taken along the axis of rotational symmetry.
Figure 5:
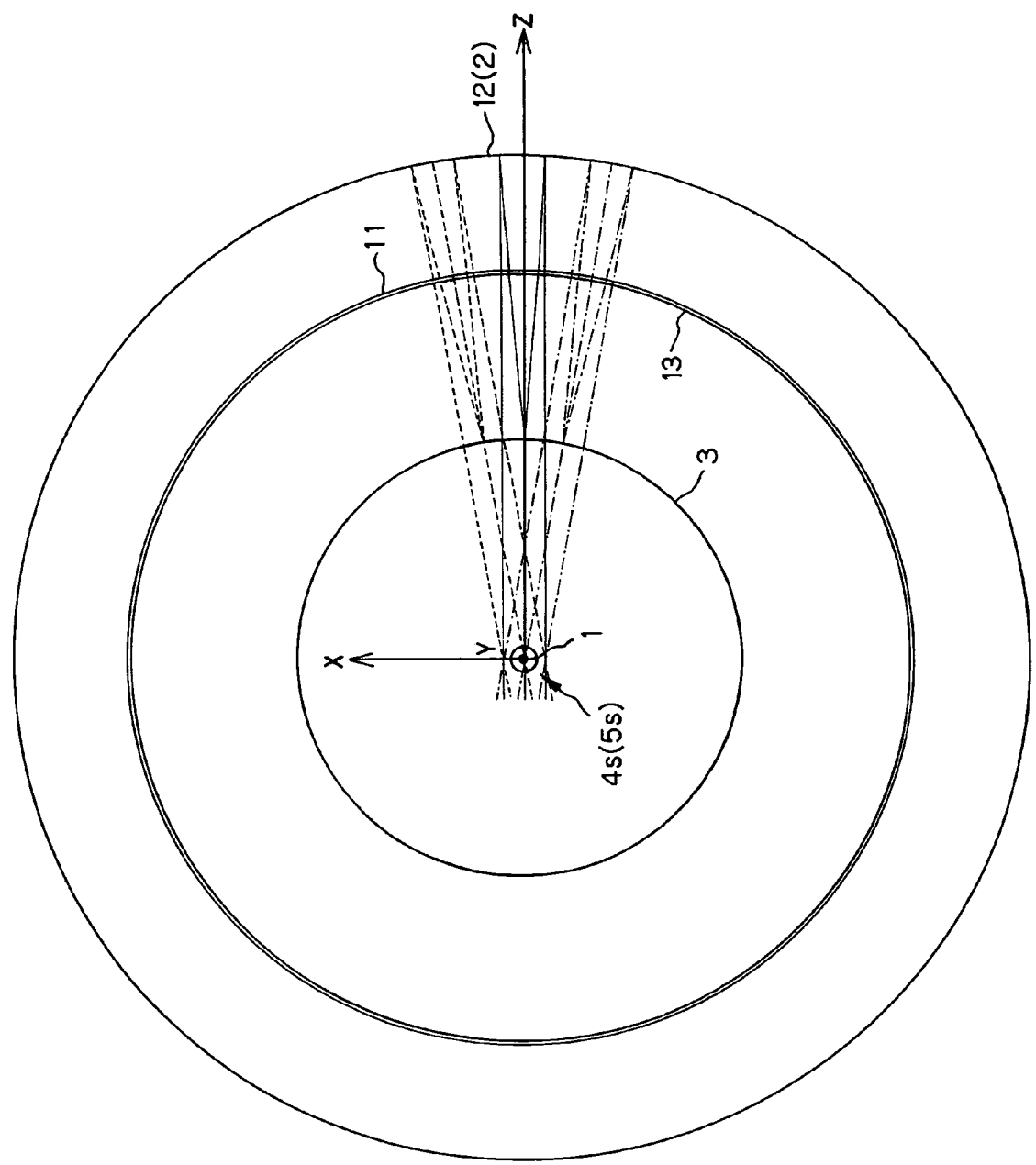
FIG. 5 is a plan view as taken in a direction along the axis of rotational symmetry, illustrative of an optical path through the optical system of Example 2.
Figure 6:
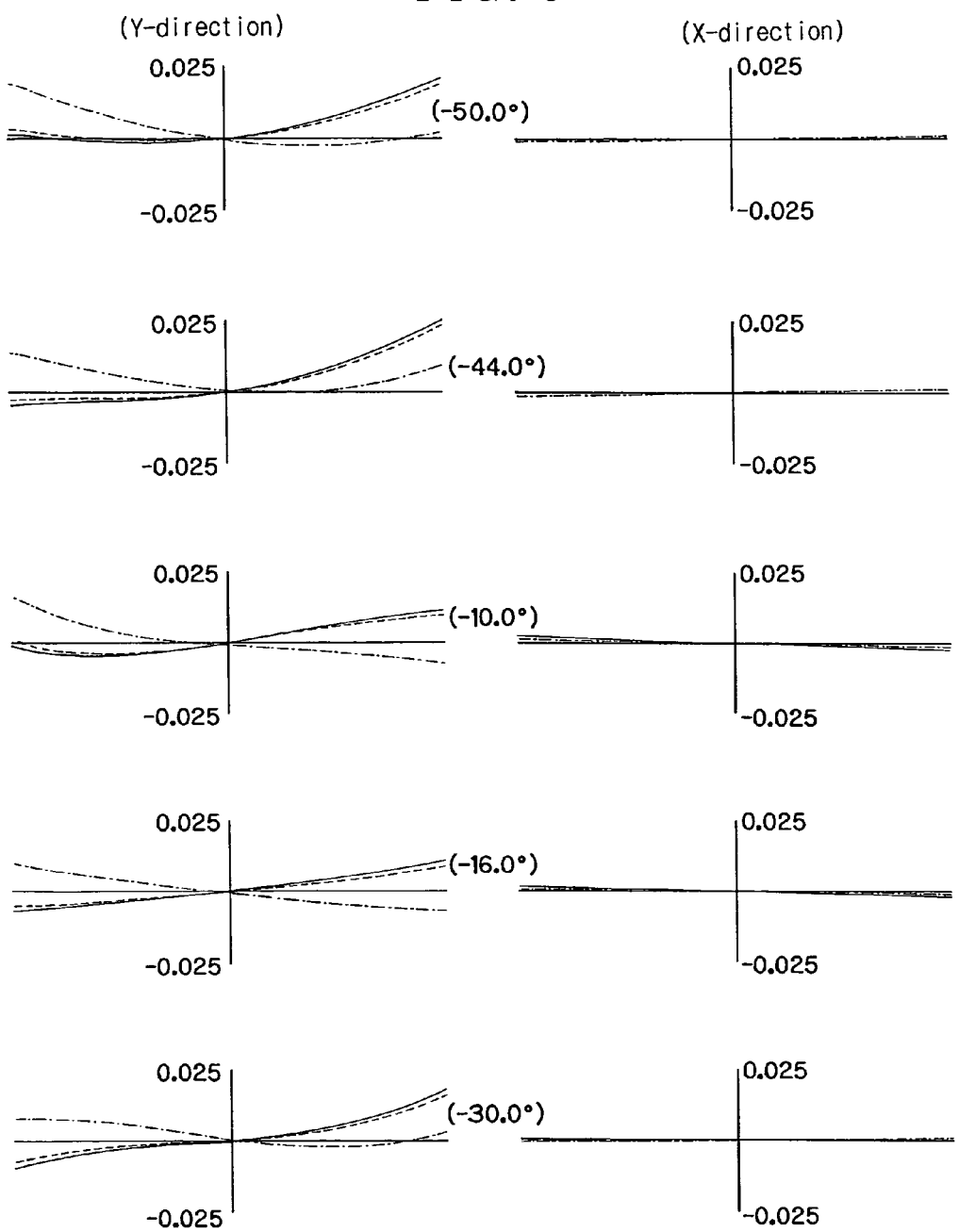
FIG. 6 is a transverse aberration diagram at an object point for the whole optical system of Example 2.

FIG. 4 is a sectional view of the optical system of Example 2 as taken along the center axis 1 of rotation, FIG. 5 is a plan view of an optical path through that optical system as viewed along the center axis 1 of rotation, and FIG. 6 is a transverse aberration diagram at an infinite object point for the whole optical system according to Example 2.

The example here is directed to an imaging optical system using a transparent medium 10 that is in an annular form with the center axis 1 of rotation as an axis of rotational symmetry, is of a reflecting prism shape in section and has a refractive index of greater than 1. The transparent medium 10 is made up of an entrance refractive surface 11, an internal reflective surface (mirror) 12 that forms a reflective surface 2, and an exit refractive surface 13. The optical surfaces 11, 12 and 13 are each made up of a rotationally symmetric surface with the center axis 1 of rotation as the axis of rotational symmetry, wherein the entrance refractive surface 11 and exit refractive surface 13 are each formed of an extended rotation free-form surface having positive power in the meridional section and the internal reflective surface 12 is built up of a conical surface, and an image surface (display surface) 3 is formed of a cylindrical surface. And then, an entrance pupil 4s and an exit pupil 5s in the sagittal surface are located at a distance on the Y-axis of the axis 1 of rotational symmetry (the center axis of rotation). In the meridional surface, the width of the internal reflective surface 12 in the direction of the axis 1 of rotational symmetry forms a stop, and an entrance pupil 4m for the meridional section is formed near the internal reflective surface 12.

As viewed according to normal ray tracing, light from an infinite object point (a projection surface in the case of back ray tracing) passes through the entrance pupil 4s in the sagittal surface and the decentered entrance refractive surface 11, entering the transparent medium 10. Then, the light enters the internal reflective surface 12 obliquely with respect to the Y-axis by way of a decentered optical path. Then, the light is reflected at that reflective surface 12, leaving the transparent medium 10 through the exit refractive surface 13. Then, the light travels toward the exit pupil 5s in the sagittal surface away from the entrance pupil 4s on the Y-axis, and finally enters the image surface (display surface) 3 on the entrance side of the exit pupil 5s to form an image of the object point.

With such decentered arrangement using the annular transparent medium 10 of a reflecting prism shape in section, the light from the 360° panoramic scene enters the transparent medium 10 through the entrance pupil 4s in the sagittal surface, then enters the internal reflective surface 12 through the entrance pupil 4m in the meridional surface, at which it is reflected, and leaves the transparent medium 10 to enter the image surface 3, so that it can be formed into a high-definition image in the wide angle-of-view range of 40° in the vertical angle of view of 10° to 50°.

The specifications of Example 2 are:

| | |
|---|---|
| Horizontal angle of view: | 360° |
| Vertical angle of view: | 20° |
| Entrance pupil diameter: | 2.50 mm |
| Image size: | Cylindrical surface of Φ 22.11 mm and 12.38 mm in height |

EXAMPLE 3

Figure 7:
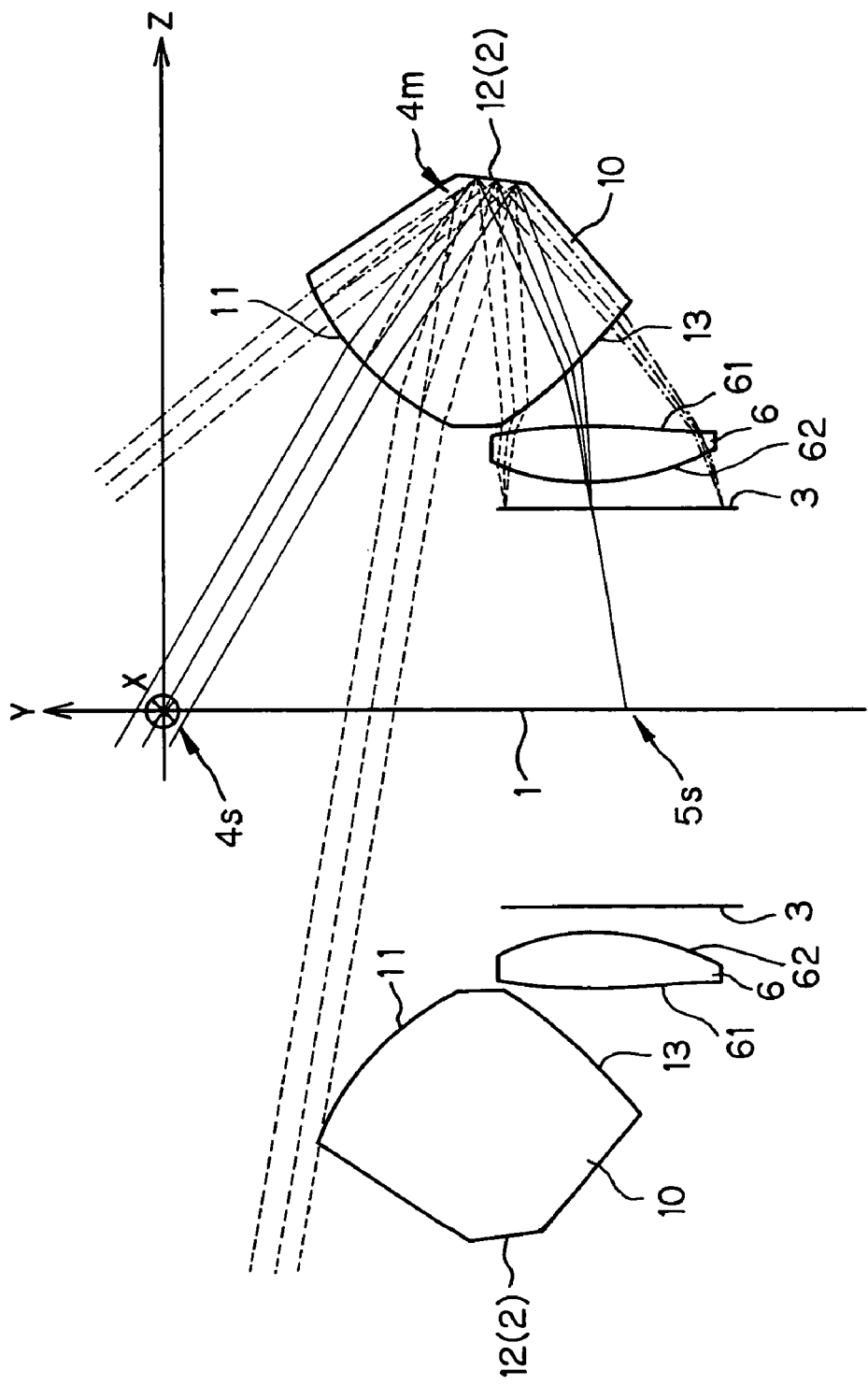
FIG. 7 is illustrative in section of the optical system of Example 3 according to the invention, as taken along the axis of rotational symmetry.
Figure 8:
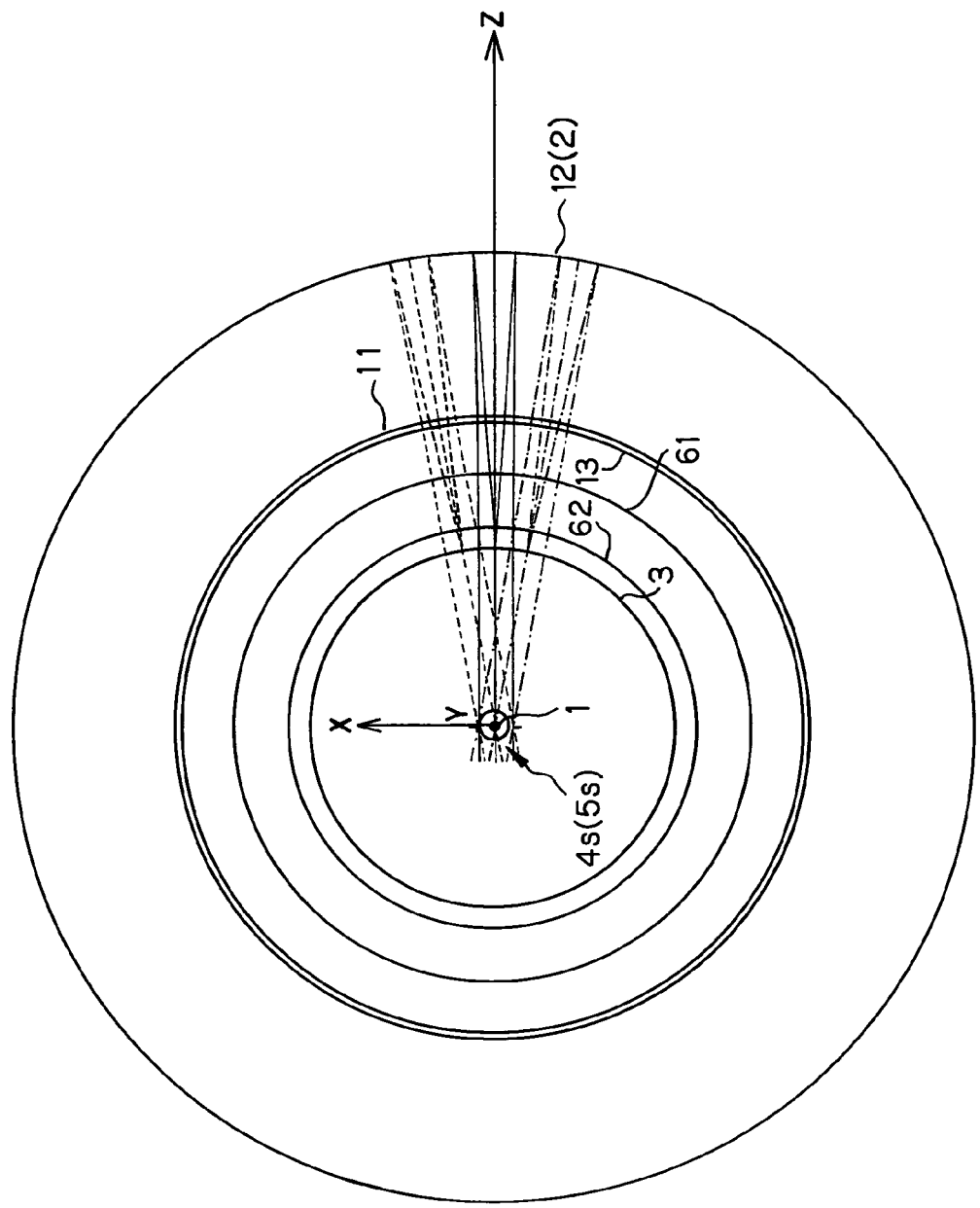
FIG. 8 is a plan view as taken in a direction along the axis of rotational symmetry, illustrative of an optical path through the optical system of Example 3.
Figure 9:
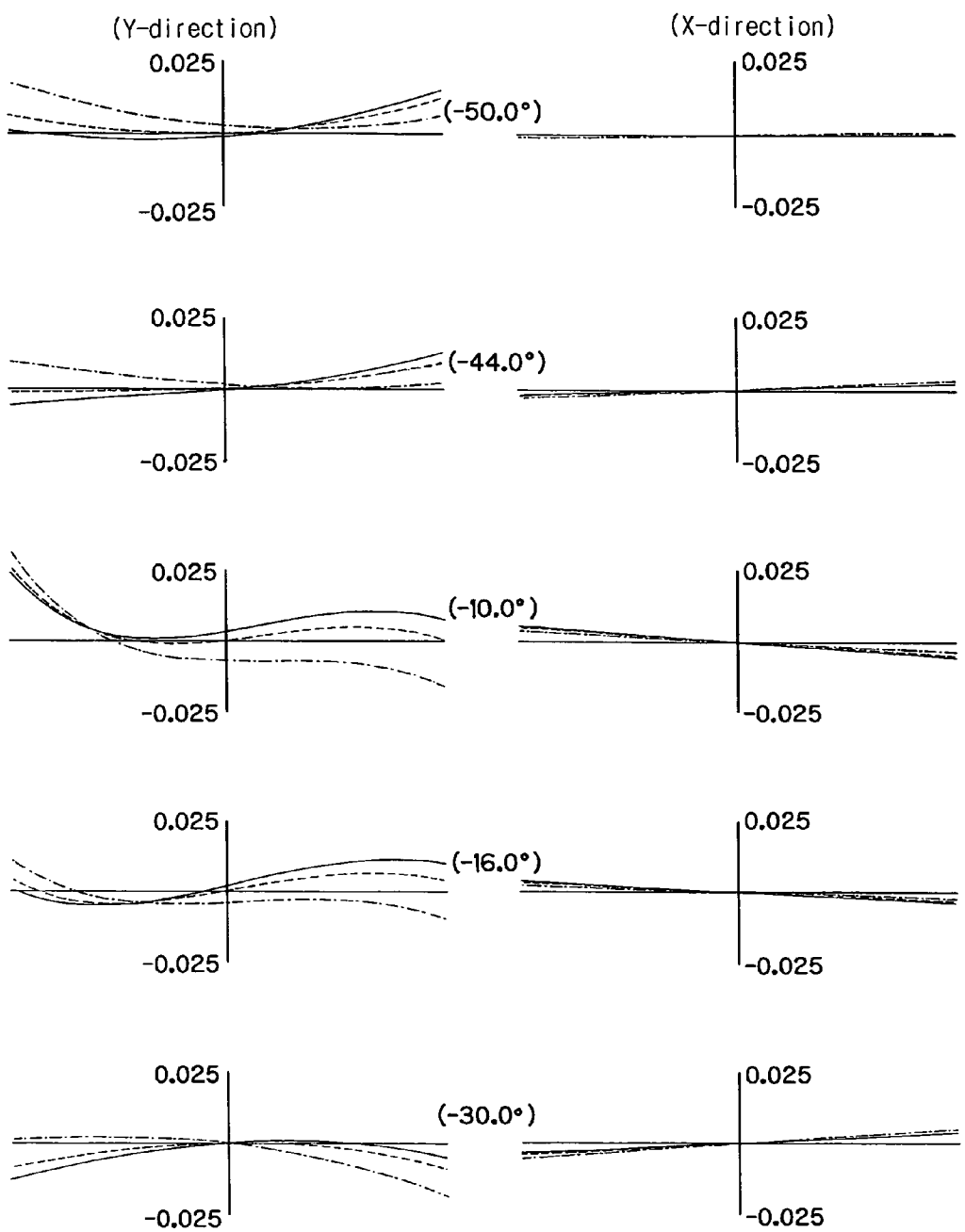
FIG. 9 is a transverse aberration diagram at an infinite object point for the whole optical system of Example 3.

FIG. 7 is a sectional view of the optical system of Example 3 as taken along the center axis 1 of rotation, FIG. 8 is a plan view of an optical path through that optical system as viewed along the center axis 1 of rotation, and FIG. 9 is a transverse aberration diagram at an infinite object point for the whole optical system according to Example 3.

The example here is directed to an imaging optical system using a transparent medium 10 that is in an annular form with the center axis 1 of rotation as an axis of rotational symmetry, is of a reflecting prism shape in section and has a refractive index of greater than 1 as well as a transparent medium 6 that, as described just above, is in an annular form with the center axis 1 of rotation as an axis of rotational symmetry, is of a lens shape in section and has a refractive index of greater than 1. The transparent medium 10 is made up of an entrance refractive surface 11, an internal reflective surface (mirror) 12 that forms a reflective surface 2, and an exit refractive surface 13. The optical surfaces 11, 12 and 13 are each made up of a rotationally symmetric surface with the center axis 1 of rotation as the axis of rotational symmetry, wherein the entrance refractive surface 11 and exit refractive surface 13 are each formed of an extended rotation free-form surface having positive power in the meridional section and the internal reflective surface 12 is built up of a conical surface. The transparent medium 6 is made up of an entrance refractive surface 61 and an exit refractive surface 62; the optical surfaces 61 and 62 are each made up of a rotationally symmetric surface with the center axis 1 of rotation as an axis of rotational symmetry or the entrance refractive surface 61 and exit refractive surface 62 are each made of an extended rotation free-from surface having positive power in the meridional section. An image surface (display surface) 3 is formed of a cylindrical surface. And then, an entrance pupil 4s and an exit pupil 5s in the sagittal surface are located at a distance on the Y-axis of the axis 1 of rotational symmetry (the center axis of rotation). In the meridional surface, the width of the internal reflective surface 12 in the direction of the axis 1 of rotational symmetry forms a stop, and an entrance pupil 4m for the meridional section is formed near the internal reflective surface 12.

As viewed according to normal ray tracing, light from an infinite object point (a projection surface in the case of back ray tracing) passes through the entrance pupil 4s in the sagittal surface and the decentered entrance refractive surface 11, entering the transparent medium 10. Then, the light enters the internal reflective surface 12 obliquely with respect to the Y-axis by way of a decentered optical path. Then, the light is reflected at that reflective surface 12, leaving the transparent medium 10 through the exit refractive surface 13. Then, the light travels through the entrance and exit refractive surfaces 61 and 62 of the transparent medium 60 toward the exit pupil 5s in the sagittal surface away from the entrance pupil 4s on the Y-axis, and finally enters the image surface (display surface) 3 on the entrance side of the exit pupil 5s to form an image of the object point.

With such decentered arrangement using the annular transparent medium 10 of a reflecting prism shape in section, the light from the 360° panoramic scene enters the transparent medium 10 through the entrance pupil 4s in the sagittal surface, then enters the internal reflective surface 12 through the entrance pupil 4m in the meridional surface, at which it is reflected, and leaves the transparent medium 10. Finally, the light passes through the entrance and exit refractive surfaces 61 and 62 of the transparent medium 60 to enter the image surface 3, so that it can be formed into a high-definition image in the wide angle-of-view range of 40° in the vertical angle of view of 10° to 50°.

The specifications of Example 3 are:

| | |
|---|---|
| Horizontal angle of view: | 360° |
| Vertical angle of view: | 20° |
| Entrance pupil diameter: | 2.83 mm |
| Image size: | Cylindrical surface of φ 21.35 mm and 11.46 mm in height |

According to the optical system of Example 3 wherein an additional optical element (transparent medium) 6 of a lens shape in section is provided between the image surface 3 and the reflective surface 2 to improve on telecentricity on the image surface 3 side while there is a wide angle of view ensured in the meridional section.

EXAMPLE 4

Figure 10:
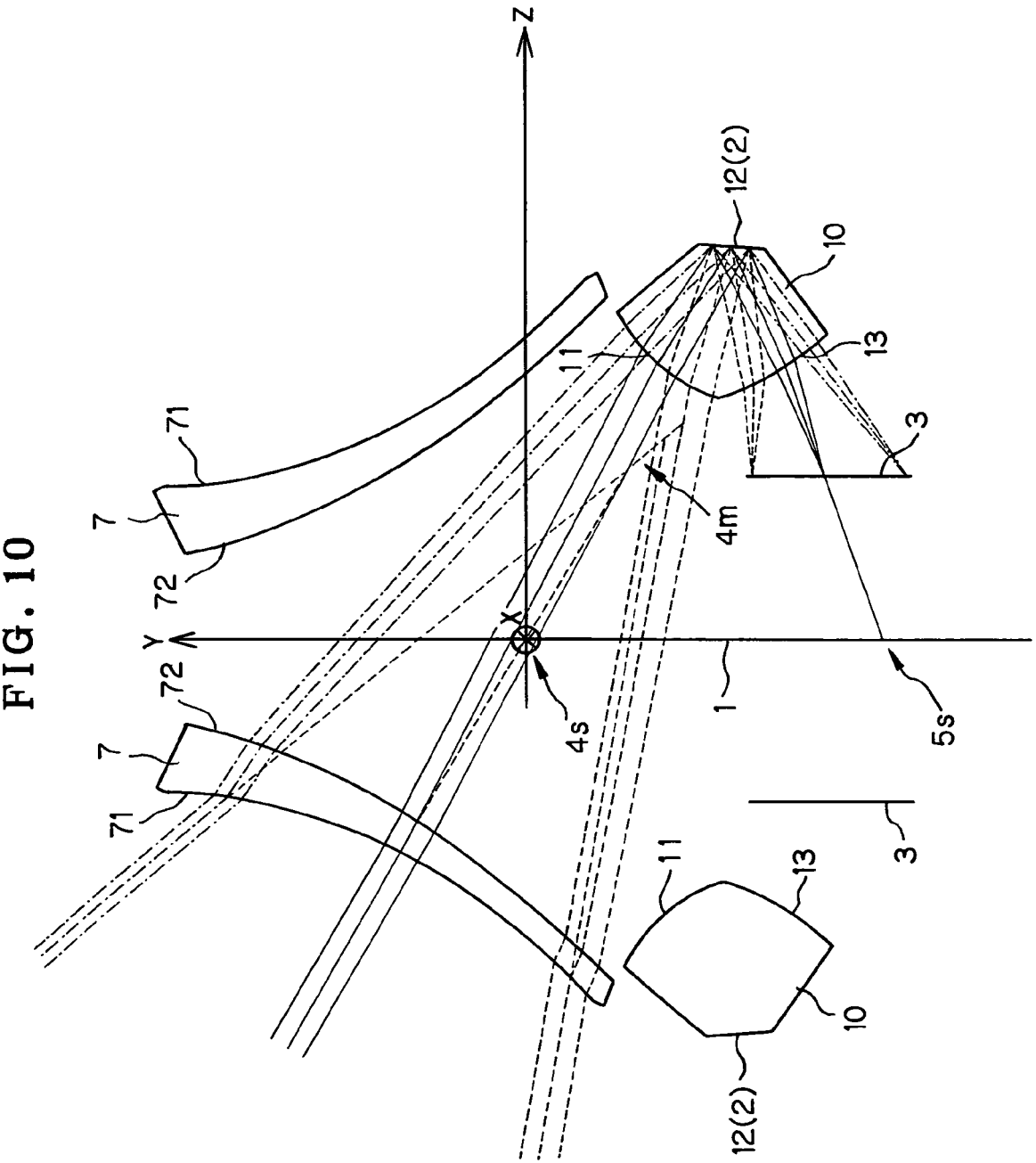
FIG. 10 is illustrative in section of the optical system of Example 4 according to the invention, as taken along the axis of rotational symmetry.
Figure 11:
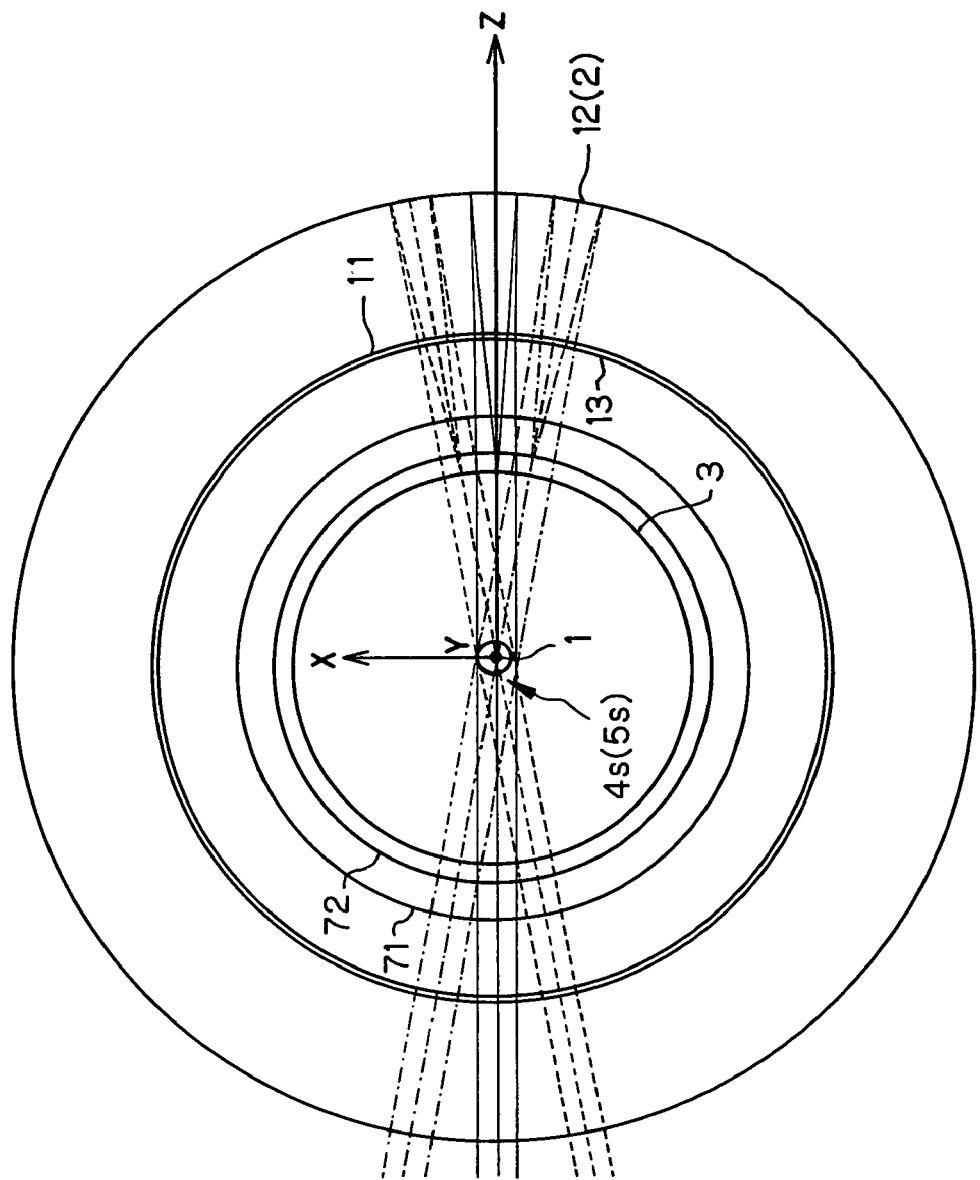
FIG. 11 is a plan view as taken in a direction along the axis of rotational symmetry, illustrative of an optical path through the optical system of Example 4.
Figure 12:
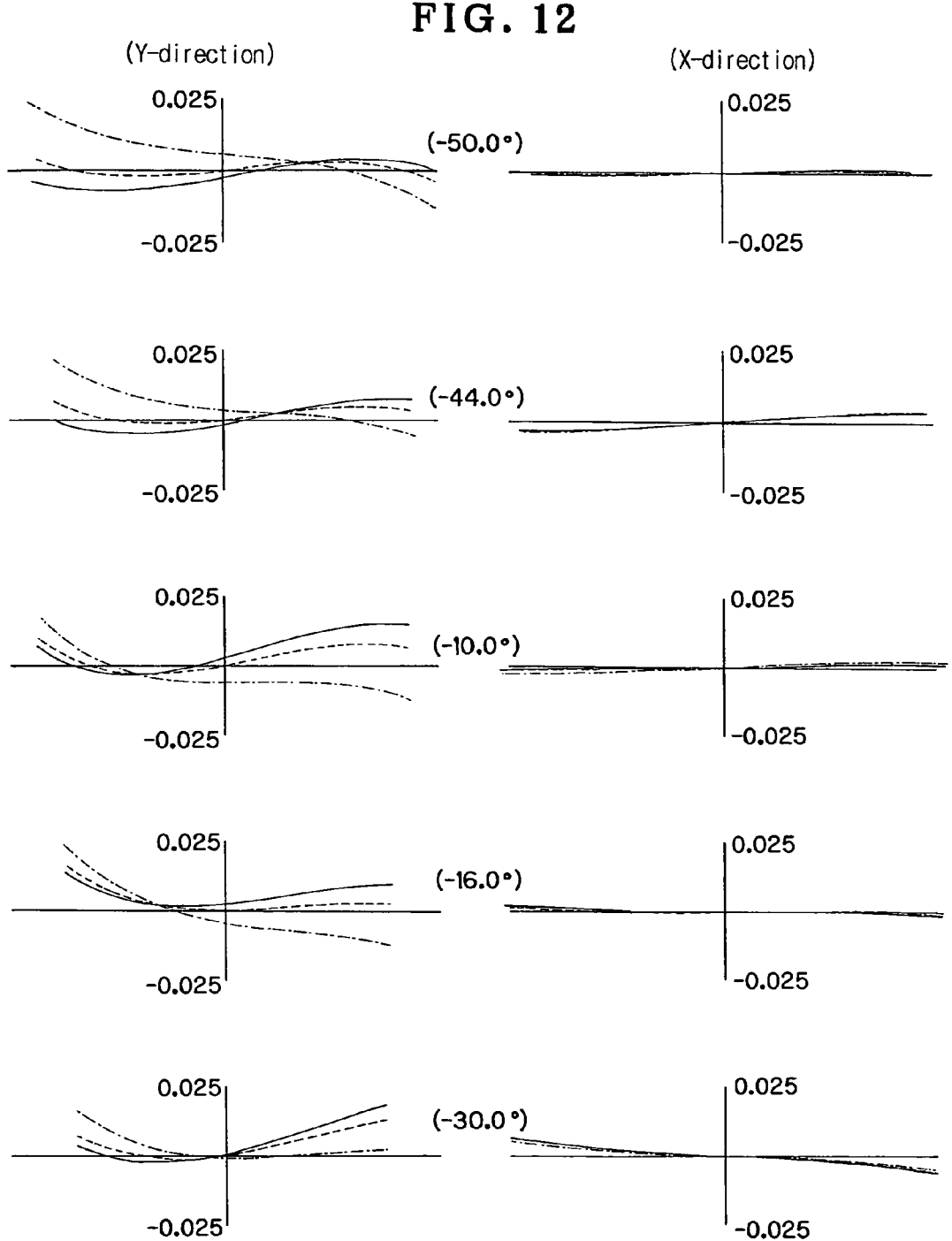
FIG. 12 is a transverse aberration diagram at an infinite object point for the whole optical system of Example 4.

FIG. 10 is a sectional view of the optical system of Example 4 as taken along the center axis 1 of rotation, FIG. 11 is a plan view of an optical path through that optical system as viewed along the center axis 1 of rotation, and FIG. 12 is a transverse aberration diagram at an infinite object point for the whole optical system according to Example 4.

The example here is directed to an imaging optical system using a transparent medium 10 that is in an annular form with the center axis 1 of rotation as an axis of rotational symmetry, is of a reflecting prism shape in section and has a refractive index of greater than 1 as well as a transparent medium 7 that, as described just above, is in an annular form with the center axis 1 of rotation as an axis of rotational symmetry, is of a lens shape in section and has a refractive index of greater than 1. The transparent medium 10 is made up of an entrance refractive surface 11, an internal reflective surface (mirror) 12 that forms a reflective surface 2, and an exit refractive surface 13. The optical surfaces 11, 12 and 13 are each made up of a rotationally symmetric surface with the center axis 1 of rotation as the axis of rotational symmetry, wherein the entrance refractive surface 11 and exit refractive surface 13 are each formed of an extended rotation free-form surface having positive power in the meridional section and the internal reflective surface 12 is built up of a conical surface. The transparent medium 7 is made up of an entrance refractive surface 71 and an exit refractive surface 72; the optical surfaces 71 and 72 are each made up of a rotationally symmetric surface with the center axis 1 of rotation as an axis of rotational symmetry or the entrance refractive surface 71 and exit refractive surface 72 are each made of an extended rotation free-from surface having positive power in the meridional section. An image surface (display surface) 3 is formed of a cylindrical surface. And then, an entrance pupil 4s and an exit pupil 5s in the sagittal surface are located at a distance on the Y-axis of the axis 1 of rotational symmetry (the center axis of rotation). In the meridional surface, the width of the internal reflective surface 12 in the direction of the axis 1 of rotational symmetry forms a stop, and an entrance pupil 4m for the meridional section is formed near the internal reflective surface 12.

As viewed according to normal ray tracing, light from an infinite object point (a projection surface in the case of back ray tracing) travels toward and enters the entrance pupil 4s in the sagittal surface, and is refracted at the entrance and exit refractive surfaces 71 and 72 of the transparent medium 7 that is on the object side with respect to the axis 1 of rotational symmetry (the center axis of rotation) and is of a negative meniscus shape in meridional section. The refractive light enters the transparent medium 10 through the decentered entrance refractive surface 11 that faces away from the object side of the axis 1 of rotational symmetry (the center axis of rotation). Then, the light enters the internal reflective surface 12 obliquely with respect to the Y-axis by way of a decentered optical path. Then, the reflected light leaves the transparent medium 10 through the exit refractive surface 13, and travels toward the exit pupil 5s in the sagittal surface away from the entrance pupil 4s on the Y-axis, and finally enters the image surface (display surface) 3 on the entrance side of the exit pupil 5s to form an image of the object point.

With such decentered arrangement using the annular transparent medium 10 of a reflecting prism shape in section, the light from the 360° panoramic scene travels toward the entrance pupil 4s in the sagittal surface, and enters the internal reflective surface 12 through the entrance and exit refractive surfaces 71 and 72, at which it is reflected. The reflected light leaves the transparent medium 10 and enters the image surface 3, so that it can be formed into a high-definition image in the wide angle-of-view range of 40° in the vertical angle of view of 10° to 50°.

The specifications of Example 4 are:

| | |
|---|---|
| Horizontal angle of view: | 360° |
| Vertical angle of view: | 40° |
| Entrance pupil diameter: | 2.39 mm |
| Image size: | Cylindrical surface of φ 18.42 mm and 8.64 mm in height |

According to the optical system of Example 4 wherein an additional optical element (transparent medium) 7 of a lens shape in section is provided between the object surface and the reflective surface 2 to succeed in making sure a large angle of view in the meridional section.

Set out below the essential parameters for Examples 1-4 above. In the following tables, "YTR", "ERFS" and "RE" are indicative of a Y toric surface, an extended rotation free-form surface, and a reflective surface, respectively.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Sagital Entrance Pupil) | | | | |
| 2 | ERFS [1] | | (1) | 1.5163 | 64.1 |
| 3 | ERFS [2] (RE) | | (2) | 1.5163 | 64.1 |
| 4 | ERFS [3] | | (3) | | |
| Image plane | YTR [1] | | (4) | | |

ERFS [1]

| | |
|---|---|
| RY | 6.99 |
| θ | 0.00 |
| R | 15.00 |
| $C_2$ | $4.9002 \times 10^{-1}$ |

ERFS [2]

| | |
|---|---|
| RY | −115.98 |
| θ | 0.00 |
| R | 18.04 |
| $C_4$ | $-6.8520 \times 10^{-4}$ |
| $C_5$ | $2.0917 \times 10^{-4}$ |

ERFS [3]

| | |
|---|---|
| RY | 4.15 |
| θ | 0.00 |
| R | 12.00 |
| $C_2$ | $-6.3463 \times 10^{-1}$ |

YTR [1]

| | |
|---|---|
| Rx | −8.02 |
| Ry | ∞ |

Displacement and tilt (1)

| | | | | | |
|---|---|---|---|---|---|
| X | 0.00 | Y | −5.46 | Z | 0.00 |
| α | 0.00 | β | 0.00 | γ | 0.00 |

Displacement and tilt (2)

| | | | | | |
|---|---|---|---|---|---|
| X | 0.00 | Y | −6.70 | Z | 0.00 |
| α | 0.00 | β | 0.00 | γ | 0.00 |

Displacement and tilt (3)

| | | | | | |
|---|---|---|---|---|---|
| X | 0.00 | Y | −9.15 | Z | 0.00 |
| α | 0.00 | β | 0.00 | γ | 0.00 |

Displacement and tilt (1)

| | | | | | |
|---|---|---|---|---|---|
| X | 0.00 | Y | −10.34 | Z | 0.00 |
| α | 0.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Sagital Entrance Pupil) | | | | |
| 2 | ERFS [1] | | (1) | 1.5163 | 64.1 |
| 3 | ERFS [2] (RE) | | (2) | 1.5163 | 64.1 |
| 4 | ERFS [3] | | (3) | | |
| Image plane | YTR [1] | | (4) | | |

ERFS [1]

| | |
|---|---|
| RY | 11.10 |
| θ | −37.89 |
| R | 19.39 |
| $C_4$ | $-1.7709 \times 10^{-4}$ |
| $C_5$ | $-2.0927 \times 10^{-4}$ |

ERFS [2]

| | |
|---|---|
| RY | ∞ |
| θ | −2.91 |
| R | 25.00 |

ERFS [3]

| | |
|---|---|
| RY | 18.40 |
| θ | 35.95 |
| R | 19.28 |
| $C_4$ | $1.7918 \times 10^{-3}$ |
| $C_5$ | $-3.3335 \times 10^{-4}$ |

YTR [1]

| | |
|---|---|
| Rx | −11.06 |
| Ry | ∞ |

Displacement and tilt (1)

| | | | | | |
|---|---|---|---|---|---|
| X | 0.00 | Y | −11.20 | Z | 0.00 |
| α | 0.00 | β | 0.00 | γ | 0.00 |

Displacement and tilt (2)

| | | | | | |
|---|---|---|---|---|---|
| X | 0.00 | Y | −14.80 | Z | 0.00 |
| α | 0.00 | β | 0.00 | γ | 0.00 |

Displacement and tilt (3)

| | | | | | |
|---|---|---|---|---|---|
| X | 0.00 | Y | −17.70 | Z | 0.00 |
| α | 0.00 | β | 0.00 | γ | 0.00 |

Displacement and tilt (4)

| | | | | | |
|---|---|---|---|---|---|
| X | 0.00 | Y | −21.03 | Z | 0.00 |
| α | 0.00 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Sagital Entrance Pupil) | | | | |
| 2 | ERFS [1] | | (1) | 1.5163 | 64.1 |
| 3 | ERFS [2] (RE) | | (2) | 1.5163 | 64.1 |
| 4 | ERFS [3] | | (3) | | |
| 5 | ERFS [4] | | (4) | 1.5163 | 64.1 |
| 6 | ERFS [5] | | (5) | | |
| Image plane | YTR [1] | | (6) | | |

ERFS [1]

| RY | 14.24 |
| θ | −46.47 |
| R | 18.41 |
| $C_4$ | $5.3789 \times 10^{-4}$ |
| $C_5$ | $-5.1678 \times 10^{-5}$ |

ERFS [2]

| RY | ∞ |
| θ | −7.14 |
| R | 28.05 |

ERFS [3]

| RY | 29.36 |
| θ | 43.92 |
| R | 18.20 |
| $C_4$ | $5.6163 \times 10^{-4}$ |
| $C_5$ | $-4.4789 \times 10^{-5}$ |

ERFS [4]

| RY | −32.39 |
| θ | 0.00 |
| R | 15.0 |
| $C_4$ | $-1.1739 \times 10^{-3}$ |

ERFS [5]

| RY | 12.08 |
| θ | 0.00 |
| R | 12.00 |
| $C_4$ | $6.5592 \times 10^{-4}$ |

YTR [1]

| Rx | −10.67 |
| Ry | ∞ |

Displacement and tilt (1)

| X | 0.00 | Y | −10.63 | Z | 0.00 |
| α | 0.00 | β | 0.00 | γ | 0.00 |

Displacement and tilt (2)

| X | 0.00 | Y | −17.56 | Z | 0.00 |
| α | 0.00 | β | 0.00 | γ | 0.00 |

Displacement and tilt (3)

| X | 0.00 | Y | −21.42 | Z | 0.00 |
| α | 0.00 | β | 0.00 | γ | 0.00 |

Displacement and tilt (4)

| X | 0.00 | Y | −21.90 | Z | 0.00 |
| α | 0.00 | β | 0.00 | γ | 0.00 |

Displacement and tilt (5)

| X | 0.00 | Y | −22.19 | Z | 0.00 |
| α | 0.00 | β | 0.00 | γ | 0.00 |

Displacement and tilt (6)

| X | 0.00 | Y | −22.38 | Z | 0.00 |
| α | 0.00 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Sagital Entrance Pupil) | | | | |
| 2 | ERFS [1] | | (1) | 1.5163 | 64.1 |
| 3 | ERFS [2] | | (2) | | |
| 4 | ERFS [3] | | (3) | 1.5163 | 64.1 |
| 5 | ERFS [4] (RE) | | (4) | 1.5163 | 64.1 |
| 6 | ERFS [5] | | (5) | | |
| Image plane | YTR [1] | | (6) | | |

ERFS [1]

| RY | −32.17 |
| θ | −27.68 |
| R | 12.05 |
| $C_4$ | $-1.1111 \times 10^{-4}$ |

ERFS [2]

| RY | −46.37 |
| θ | −33.07 |
| R | 10.32 |
| $C_4$ | $-1.1003 \times 10^{-4}$ |

ERFS [3]

| RY | 9.45 |
| θ | −41.67 |
| R | −15.55 |
| $C_4$ | $-5.3185 \times 10^{-4}$ |

ERFS [4]

| RY | ∞ |
| θ | −4.20 |
| R | −22.13 |

ERFS [5]

| RY | 17.82 |
| θ | 32.89 |
| R | −15.41 |
| $C_4$ | $-1.9252 \times 10^{-4}$ |

YTR [1]

| Rx | −9.21 |
| Ry | ∞ |

Displacement and tilt (1)

| X | 0.00 | Y | 6.95 | Z | 0.00 |
| α | 0.00 | β | 0.00 | γ | 0.00 |

Displacement and tilt (2)

| X | 0.00 | Y | 5.99 | Z | 0.00 |
| α | 0.00 | β | 0.00 | γ | 0.00 |

Displacement and tilt (3)

| X | 0.00 | Y | −7.31 | Z | 0.00 |
| α | 0.00 | β | 0.00 | γ | 0.00 |

Displacement and tilt (4)

| X | 0.00 | Y | −11.45 | Z | 0.00 |
| α | 0.00 | β | 0.00 | γ | 0.00 |

Displacement and tilt (5)

| X | 0.00 | Y | −14.42 | Z | 0.00 |
| α | 0.00 | β | 0.00 | γ | 0.00 |

Displacement and tilt (6)

| X | 0.00 | Y | −16.56 | Z | 0.00 |
| α | 0.00 | β | 0.00 | γ | 0.00 |

The optical system of the invention has been described with reference to Examples 1-4. However, it is understood that if a Y toric lens is added to the object side away from the entrance pupil 4s in coaxial relation to the center axis 1 of rotation, the Y toric lens is configured into a lens built up of a surface of rotational symmetry with respect to the Y-axis (the center axis 1 of rotation) and the Y toric lens is allowed to have no power in the X-direction but have negative power in the Y-direction (within the section of FIG. 1, etc.), it is then possible to make large the angle of view in the sectional direction including the axis 1 of rotational symmetry (Example 4). More preferably, if that toric lens is configured into a negative meniscus lens convex on the object side in the Y-Z section, it is then possible to minimize the occurrence of image distortion and, hence, make good correction of aberrations.

Further, if one Y toric lens of negative meniscus lens shape in section plus two or three lenses of meniscus shape are located on the object side of the entrance pupil 4s, it is then possible to reduce the occurrence of image distortion as much as possible. It is also easy to use not only the lenses but also a reflective surface or prism rotationally symmetric with respect to the center axis 1 of rotation, thereby reflecting and refracting light rays in any desired direction for projection or image formation.

Furthermore, by using the reflective surface 2, reflective optical element 10 and transparent medium 6 rotationally symmetric about the center axis 1 of rotation of the optical system according to the invention as they stand, it is possible to take or project images having a full 360° azimuth direction angle of view. However, if the reflective surface 2, reflective optical element 10 and transparent medium 6 are divided in the section including the center axis 1 of rotation into ½, ⅓, ⅔, etc., it is then possible to take or project images having an angle of view of 180°, 120°, 240°, etc. about the center axis 1.

The optical system of the invention has been described as an imaging optical system adapted to form images from a 360° (full) panoramic scene in the distance on a cylindrical image surface while the center axis 1 of rotation (the axis of rotational symmetry) is directed in the vertical direction. If the optical path is reversed, that optical system could be used as a projection optical system adapted to project images on a cylindrical, conical or other three-dimensional display device onto a 360° (full) panoramic scene while the center axis 1 of rotation (the axis of rotational symmetry) is directed in the vertical direction.

Further, the image surface 3 could be defined by not only the cylindrical surface but also by a rotationally symmetric surface such as a conical surface.

Furthermore, the toric surface and extended rotation free-form surface could be built up of a Fresnel surface, and the optical system of the invention could be used as a circular viewing optical system for tract scopes such as endoscopes. On the other hand, the reflective surface could be constructed from a cylindrical linear Fresnel reflective surface that is grooved in a circumferential direction.

It is understood that the object distance could be set to not only an infinite distance but also a given finite distance, and an image position corresponding to that object distance could be chosen.

FIGS. 13(a) and 13(b) are illustrative in schematic of an optical path in the event that the optical system of the invention is used as (a) a panoramic taking optical system, and (b) a panoramic projection optical system. When it is used as the panoramic taking optical system, an imaging device 21 having a cylindrical, spherical, conical or other rotationally symmetric three-dimensional imaging surface 3 is located coaxially with the axis 1 of rotational symmetry of an optical system 20 according to the invention, as shown in FIG. 13(a). As light 23 from objects in the 360° panoramic scene is incident on that optical system 20, it enables panoramic images to be formed on the imaging surface 3 to take them.

When it is used as the panoramic projection optical system, a display device 25 having a cylindrical, spherical, conical or other rotationally symmetric three-dimensional display surface 3 is located coaxially with the axis 1 of rotational symmetry of an optical system 20 according to the invention, as shown in FIG. 13(b). As an illumination light source 26 located behind the display surface 3 of the display device 25 is put on while the 360° panoramic images to be projected are displayed on that display surface 3, projection light 27 from that display surface 3 passes through the optical system 20 to project the full-panoramic images onto a cylindrical, semicircular or other screen in the distance.

I claim:

1. An optical system adapted to form images from a 360° panoramic scene on a rotationally symmetric, three-dimensional image surface with an axis of rotational symmetry as a center and having at least one rotationally symmetric reflective surface, characterized in that said optical system comprises an optical member that has on an outer peripheral side thereof an annular form of internal reflective surface with said axis of rotational symmetry as a center, and that has on a center side of said axis of rotational symmetry a first aperture onto which light rays from said 360° panoramic scene are incident and a second aperture through which said light rays leave and travel toward an imaging plane and is located at a position different from the first aperture, wherein the light rays from said 360° panoramic scene are incident onto said first aperture after passing through said axis of rotational symmetry, and are only once reflected at the reflective surface that said optical member has in an optical path leading up to the imaging plane where said light rays are imaged.

2. The optical system according to claim 1, characterized in that said rotationally symmetric, three-dimensional image surface is coaxial with said rotationally symmetric reflective surface.

3. The optical system according to claim 1, characterized in that said at least one rotationally symmetric reflective surface comprises an internal reflecting mirror, wherein a light ray from the 360° panoramic scene enters a transparent medium through at least one transmitting surface for reflection at said internal reflecting mirror, and then leaves said transparent medium through at least one transmitting surface to form an image on said image surface.

4. The optical system according to claim 1, characterized in that said reflective surface has a rotationally symmetric shape defined by rotation about the axis of rotational symmetry of a line segment of any desired shape that has no plane of symmetry in a section including the axis of rotational symmetry.

5. The optical system according to claim 1, characterized in that said reflective surface has a rotationally symmetric shape defined by rotation about the axis of rotational symmetry of a line segment of any desired shape that includes an odd-numbered term in a section including the axis of rotational symmetry.

6. The optical system according to claim 1, characterized by being used as a projection optical system wherein an object surface and the image surface of said optical system are reversed.

* * * * *